United States Patent [19]

Dhyanchand et al.

[11] Patent Number: 5,012,177
[45] Date of Patent: Apr. 30, 1991

[54] POWER CONVERSION SYSTEM USING A SWITCHED RELUCTANCE MOTOR/GENERATOR

[75] Inventors: P. John Dhyanchand; Sunil Patel; Chai-Nam Ng; Vietson Nguyen, all of Rockford, Ill.

[73] Assignee: Sundstrand Corporation, Rockford, Ill.

[21] Appl. No.: 452,349

[22] Filed: Dec. 19, 1989

[51] Int. Cl.⁵ .................. H02P 9/04; H02K 23/52; H02M 5/458; H02M 1/12
[52] U.S. Cl. ........................................ 322/10; 363/37; 363/43; 290/46
[58] Field of Search ............... 363/37, 43, 49, 64; 290/46, 38 R; 322/10, 29

[56] References Cited

U.S. PATENT DOCUMENTS

| | | | |
|---|---|---|---|
| 4,119,861 | 10/1978 | Gocho | 290/35 |
| 4,841,216 | 6/1989 | Okada et al. | 290/38 R |
| 4,862,341 | 8/1989 | Cook | 290/38 R |

OTHER PUBLICATIONS

Paper Entitled "Switched Reluctance Drives" by T. J. E. Miller.
Dhyanchand, et al., U.S. Copending Patent Application Serial No. 07/421,830 Filed Oct. 16, 1989, Entitled "Power Conversion System with Stepped Waveform DC/AC Converter Having Prime Mover Start Capability".
Dhyanchand, et al. U.S. Copending Patent Application Serial No. 07/426,444, Filed Oct. 25, 1989, Entitled "Power Conversion With Stepped-Waveform DC/AC Converter Having Prime Mover Start Capability".

*Primary Examiner*—William H. Beha, Jr.
*Assistant Examiner*—Nilay H. Vyas
*Attorney, Agent, or Firm*—Marshall, O'Toole, Gerstein, Murray & Bicknell

[57] ABSTRACT

Prior power conversion system operable in generating and starting modes have utililzed brushless generators which are suitable for only certain applications. In order to overcome this problem, a power conversion system operable in generating and starting modes utilizes a switched reluctance motor/generator which is reliable and inexpensive and which can be used in a variety of environments.

11 Claims, 6 Drawing Sheets

POWER CONVERSION SYSTEM USING A SWITCHED RELUCTANCE MOTOR/GENERATOR

TECHNICAL FIELD

The present invention relates generally to power conversion systems, and more particularly to such a system which may be used either in a generating mode to convert mechanical power developed by a prime mover into electrical power or in a starting mode to convert electrical power into motive power for starting the prime mover.

BACKGROUND ART

In a power conversion system such as a variable speed, constant frequency (VSCF) power generating system, a brushless, three-phase synchronous generator operates in a generating mode to convert variable-speed motive power supplied by a prime mover into variable-frequency AC power. The variable-frequency power is rectified and provided over a DC link to a controllable static inverter. The inverter is operated to produce constant frequency AC power, which is then supplied over a load bus to one more loads.

As is known, a generator can also be operated as a motor in a starting mode to convert electrical power supplied by an external AC power source into motive power which may in turn be provided to the prime mover to bring it up to self-sustaining speed. In the case of a brushless, synchronous generator including a permanent magnet generator (PMG), an exciter portion and a main generator portion mounted on a common shaft, it has been known to provide power at a controlled voltage and frequency to the armature windings of the main generator portion and to provide field current to the main generator portion via the exciter portion so that the motive power may be developed. This has been accomplished in the past, for example, using two separate inverters, one to provide power to the main generator portion armature windings and the other to provide power to the exciter portion. Thereafter, operation in the generating mode may commence whereupon DC power is provided to the exciter field winding.

Dhyanchand, et al., U.S. Pat. Application Ser. No. 07/421,830, filed Oct. 16, 1989, now U.S. Pat. No. 4,947,100 entitled "Power Conversion System With Stepped-waveform DC/AC Converter Having Prime Mover Start Capability" discloses a power conversion system which is operable in generating and starting modes. The converter includes a rectifier bridge which is coupled to the output of a brushless, synchronous generator driven by a prime mover and first through fourth inverter bridges which are coupled to the output of the rectifier. First through fourth primary windings of a summing transformer are coupled to the outputs of the first through fourth inverter bridges, respectively. The windings of each of the first and third sets of primary windings are connected in a wye configuration whereas the windings of each of the second and fourth sets are connected in a delta configuration. The first through fourth inverters are operated to produce 24-step, constant frequency AC power in a secondary winding in the summing transformer. During operation in a starting mode, an external AC power source is coupled to the secondary winding of the summing transformer, the input of the rectifier bridge is coupled to the wye connected primary windings and the outputs of the first and third inverters are coupled to armature windings of the generator. The first and third inverters are controlled to convert the DC power produced by the rectifier into AC power for causing the generator to operate as a motor and thereby develop the required motive starting power.

Dhyanchand, et al., U.S. Pat. Application Ser. No. 07/462,444, filed Oct. 25, 1989, entitled "Power Conversion System With Stepped-waveform DC to AC Converter Having Prime Mover Start Capability", now U.S. Pat. No. 4,968,926 discloses a power conversion system utilizing a generator coupled to a prime mover and operable in generating and starting modes. The system includes a rectifier having an input and an output, first through fourth inverters each having an input and an output wherein the first inverter includes a plurality of switches and a plurality of flyback rectifiers coupled across the switches and a transformer including first through fourth sets of primary windings and a set of secondary windings wherein the first set of primary windings is coupled to the output of the first inverter. The system also includes an interphase transformer having first and second ends and a mid-tap. Contactors are operable in the generating mode to couple armature windings of the generator to the rectifier input, the rectifier output to the inputs of the inverters and the output of the second through fourth inverters to the second through fourth sets of primary windings, respectively. The contactors are operable in the starting mode to couple the source of AC power to the set of secondary windings, the second set of primary windings to the input of the rectifier, the output of the rectifier to the first end of the interphase transformer, the input of the first inverter to the second end of the interphase transformer, the mid-tap of the interphase transformer to the input of the second inverter and the output of the second inverter to the generator armature windings. The inverters are operated so that AC power produced by the generator in the generating mode is converted into DC power by the rectifier and the DC power is converted into 24-step, fixed-frequency AC power in the set of secondary windings. During operation in the starting mode, AC power induced in the first and second sets of primary windings due to application of AC power to the set of secondary windings is converted into DC power by the flyback rectifiers of the first inverter, the rectifier and the interphase transformer and the DC power is converted into AC power at a controlled frequency by the second inverter which is applied to the generator armature windings. The generator is thereby accelerated to produce motive power which is supplied to the prime mover.

While brushless generators have distinct advantages over brush-type generators, the former requires rotating rectifier assemblies and position sensors to permit operation in the starting mode. These components limit reliability and add complexity to the overall system.

Switched reluctance machines do not require rotating rectifier assemblies and position sensors and hence have advantages over brushless generators. Control of such machines is summarized in a paper entitled "Switched Reluctance Drives" by T.J.E. Miller of Glasgow University, filed herewith. It is known that a switched reluctance machine can be operated as either a motor or a generator.

SUMMARY OF THE INVENTION

In accordance with the present invention, a power conversion system utilizes a switched reluctance motor/generator which overcomes the problems noted above in connection with synchronous generators.

More particularly, a power conversion system operable in generating and starting modes includes a switched reluctance motor/generator having a motive power shaft coupled to a prime mover and an electrical winding, a first electrical power converter coupled to the electrical winding and a second electrical power converter coupled to the first electrical power converter by DC link conductors. Means are provided for coupling a load bus to the second power converter during operation in the generating mode and for coupling a source of power to either of the first and second power converters during operation in the starting mode. Means are coupled to the power converters for operating same whereby the motor/generator develops electrical power in the generating mode which is rectified by the first power converter to produce DC power on the DC link conductors. The DC power is in turn converted by the second power converter into AC output power for one or more AC loads. During operation in the starting mode, DC power provided on the DC link is used by the first power converter to cause the motor/generator to develop motive power.

Preferably, the second power converter comprises a stepped-waveform inverter including six subinverters coupled to the first power converter by the DC link conductors and a summing transformer coupled to the subinverters. Also included are three interphase transformers each having a pair of end terminals coupled to a pair of subinverters and a mid-tap coupled to the DC bus. During operation in the starting mode, the power source is coupled to the summing transformer and diodes coupled across switches in each subinverter rectify AC power supplied by the power source to produce a DC power component whereby the interphase transformers combine the DC power components to produce combined DC power on the DC link conductors.

The present system uses a switched reluctance motor/generator which is reliable, inexpensive to manufacture and which can run at very high speed and at high temperatures. Further, the motor/generator does not utilize rotating rectifier assemblies, nor does it require a position sensor for operation in the starting mode.

DESCRIPTION OF THE PREFERRED EMBODIMENT

Figure 1:
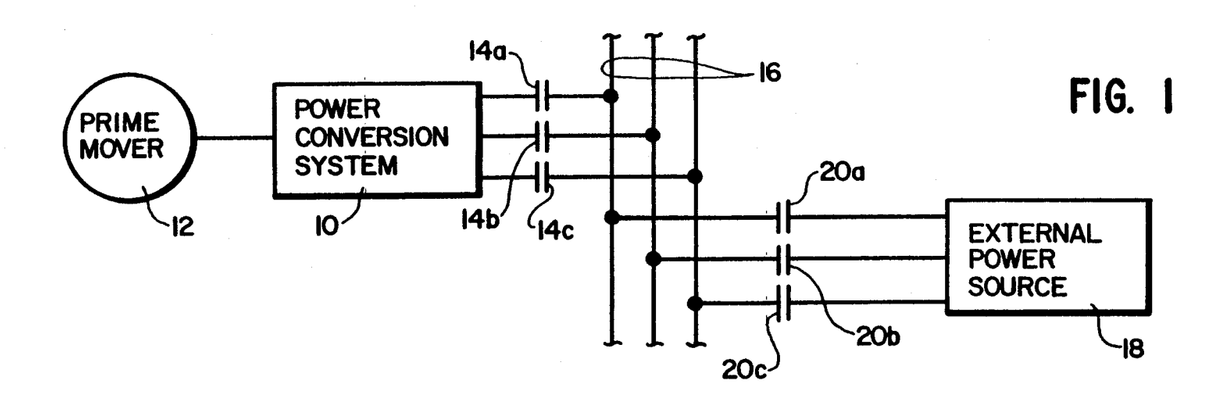
FIG. 1 is a block diagram of a power generating system incorporating the power conversion system of the present invention.

Referring now to FIG. 1, a power conversion system 10 in the form of a variable-speed, constant-frequency (VSCF) system operates in a generating mode to convert variable-speed motive power produced by a prime mover 12, such as an aircraft jet engine, into constant-frequency three-phase AC electrical power which is delivered through controllable contactors 14a, 14b and 14c to a load bus 16. The VSCF system 10 is also operable in a starting mode using power produced by an external power source 18, such as a ground power cart. As noted in greater detail hereinafter, the external power source 18 preferably produces AC power, although as noted in greater detail hereinafter, the power source 18 may develop DC power for starting of the prime mover 12. During operation in the starting mode, the power source 18 is coupled to the power conversion system 10 through controllable contactors 20a–20c. If necessary or desirable, the electrical power for use by the VSCF system 10 in the starting mode may be provided by another source of power, such as another VSCF system which is driven by a different prime mover. In any event, the VSCF system 10 converts electrical power into motive power when operating in the starting mode to bring the prime mover 12 up to self-sustaining speed. Once this self-sustaining speed (also referred to as "light-off") is reached, the prime mover 12 may be accelerated to operating speed, following which operation in the generating mode may commence.

Figure 2:
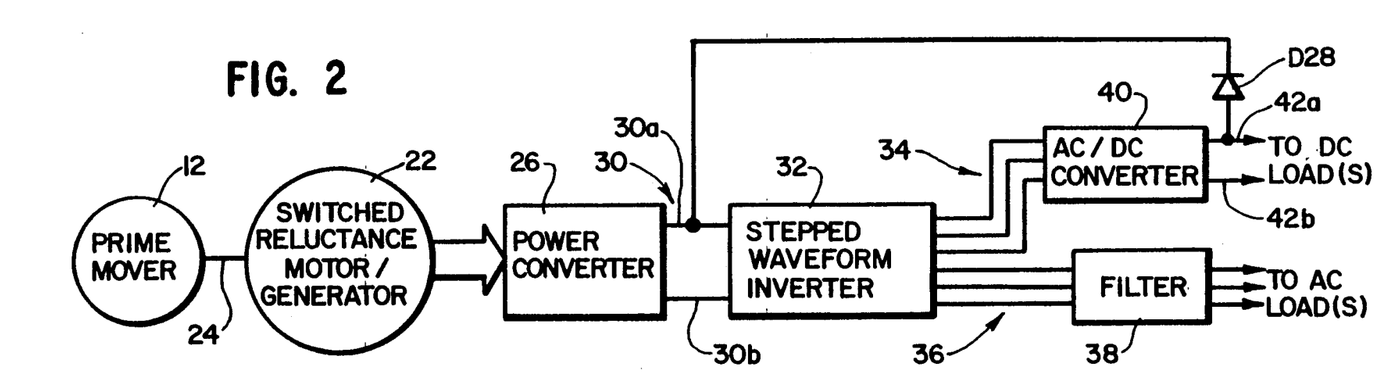
FIG. 2 a simplified combined mechanical and electrical block diagram of the power generating system shown in FIG. 1.

Referring now to FIG. 2, the VSCF system 10 includes a switched reluctance motor/generator 22 which is coupled by a shaft 24 to the prime mover 12. During operation in the generating mode, the prime mover 12 drives the motor/generator 22 so that it develops electrical power which is converted by a first power converter 26 into DC power on a DC link 30 comprising link conductors 30a and 30b. The DC power is converted by a second power converter in the form of a stepped-waveform inverter 32 into AC power on first and second sets of output lines 34, 36. The AC power developed on the second set of output lines 36 may be filtered by an optional filter 38 and provided to the load bus 16 via the contactors 14a–14c.

The AC power produced on the first set of output lines 34 may be converted into DC power by an AC/DC converter 40 which is in turn coupled to a DC load bus 42 comprising DC bus conductors 42a, 42b.

During operation in the starting mode, in the event that the external power source 18 develops AC power, the contactors 20a–20c and 14a–14c are closed, in turn coupling the power source 18 to the filter 38 and the stepped-waveform inverter 32. The inverter 32 includes flyback diodes, described in greater detail hereinafter, which rectify the AC power to produce DC power on the DC link 30. The DC power is utilized by the power converter 26 to operate the motor/generator 22 as a motor to in turn produce motive power for starting of the prime mover 12.

Figure 3:
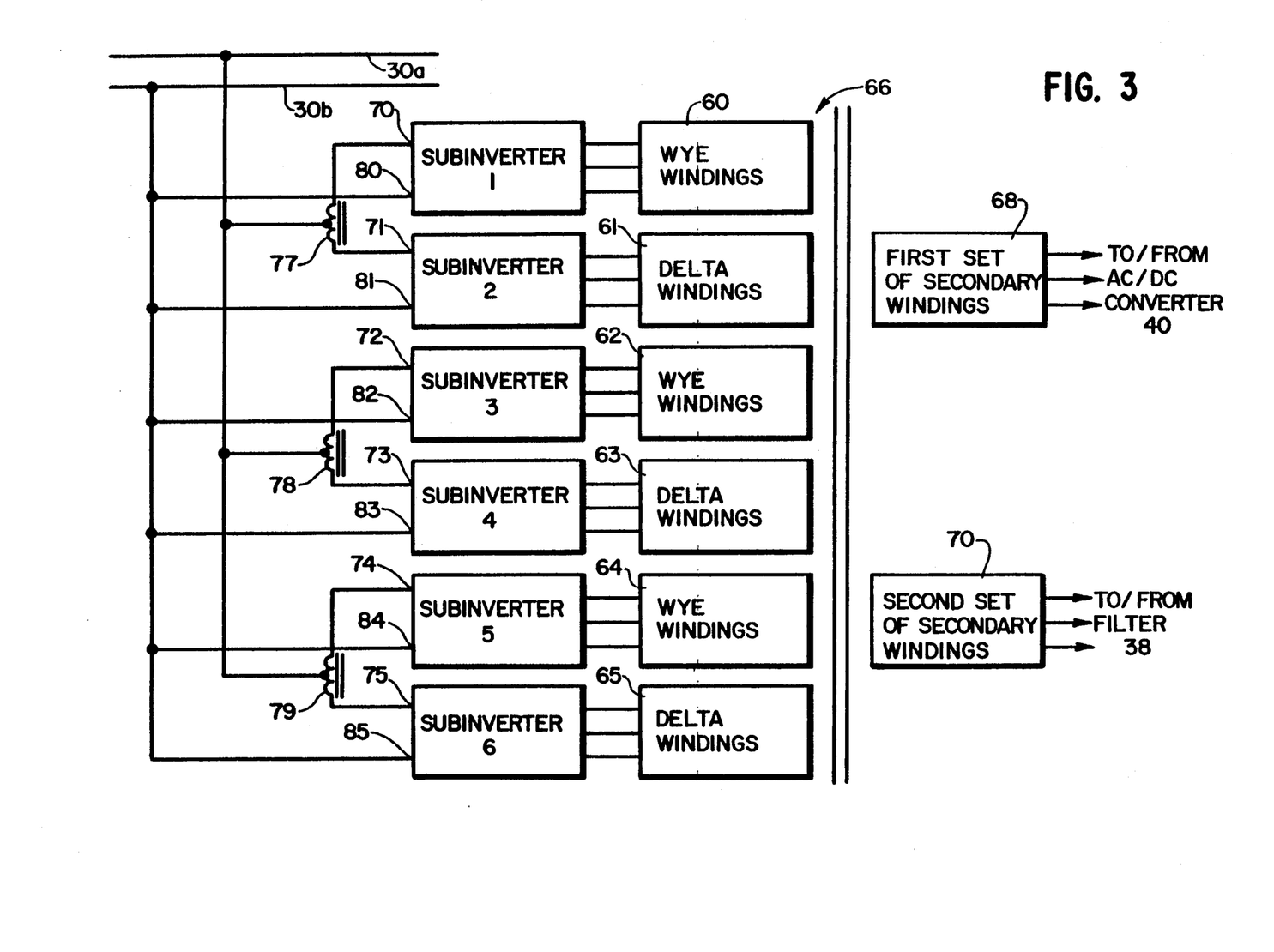
FIG. 3 is a simplified combined schematic and block diagram of the stepped-waveform inverter shown in FIG. 2.

Referring now to FIG. 3, the stepped-waveform inverter 32 preferably includes six subinverters 50–55, each of which is coupled to an associated set of primary windings 60–65 of a summing transformer 66. The sets of primary windings 60, 62 and 64 are connected in a wye or star configuration while the remaining sets of primary windings 61, 63 and 65 are connected in a delta configuration. The summing transformer 66 further includes first and second sets of secondary windings 68, 70 which are coupled to the AC/DC converter 40 and the filter 38, respectively.

Each subinverter 50-55 includes a positive DC terminal 70-75, respectively, all of wherein successive pairs 70 and 71, 72 and 73, 74 and 75 of positive terminals are coupled to end terminals of first through third interphase transformers 77-79, respectively. Each of the interphase transformers 77-79 includes a mid-tap which is coupled to the DC link conductor 30a.

Each of the subinverters 50-55 further includes a negative DC terminal 80-85, respectively, all of which are coupled to the DC link conductor 30b.

Figure 4:
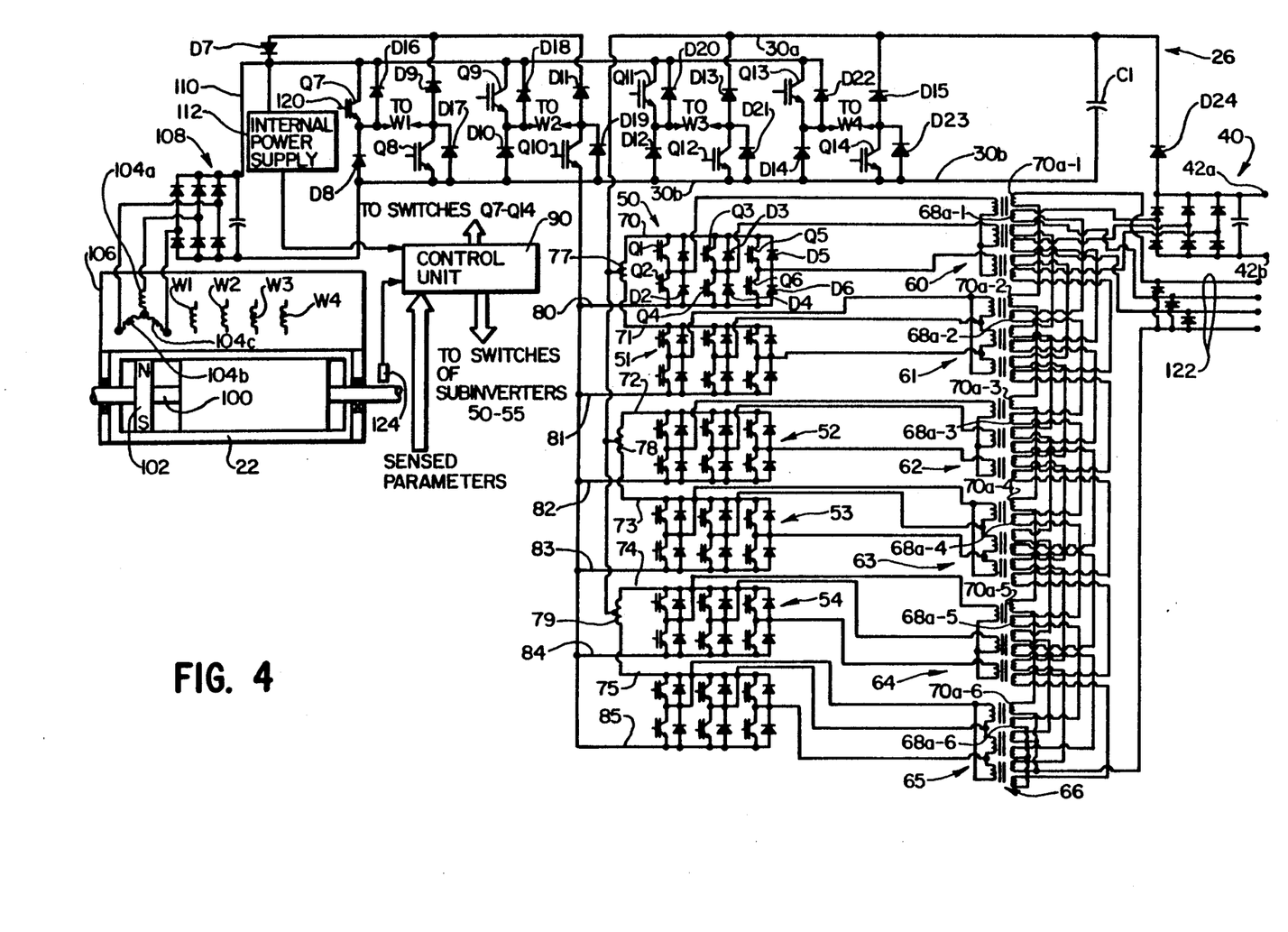
FIG. 4 is a simplified combined schematic and block diagram of a portion of the power conversion system of the present invention.

Referring now to FIG. 4, the subinverters 50-55 are identical, and hence only the subinverter 50 will be described in detail. Six power switches Q1-Q6, which are preferably insulated gate bipolar transistors (IGBT's) are connected together in a conventional three-phase bridge configuration. Coupled across each of the switches Q1-Q6 is an associated flyback diode D1-D6 respectively. During operation in the generating mode, the switches of the subinverters 50-55 are operated by a control unit 90 which is responsive to one or more sensed parameters, such as the voltage and current at or near a point of regulation (POR) in the vicinity of the load bus 16, the voltage and current developed on the DC link conductors 30a, 30b and the like. The control unit 90 operates the switches Q1-Q6 and the switches of the remaining subinverters 51-55 to produce 36-step output power in the first and second sets of secondary windings 68, 70. The first set of secondary windings 68 in turn includes three subsets of series-connected windings, for example, the subset comprising secondary windings 68a-1 through 68a-6. Two additional subsets of series-connected secondary windings are provided for the remaining phases in the output power developed by the secondary winding 68.

In like fashion, the second set of secondary windings 70 includes three subsets of series-connected secondary windings exemplified by the six series-connected secondary windings 70a-1 through 70a-6.

The switched reluctance motor/generator 22 includes a rotor shaft 100 which is coupled to the shaft 24. The motor/generator 22 includes a rotor structure in the form of a permanent magnet 102 which, when rotated by the prime mover 12, develops polyphase power in armature windings 104a-104c disposed in a stator 106 of the machine. The AC power developed in the armature windings 104a-104c is rectified and filtered by a rectifier/filter 108 and the resulting DC power is provided to a DC conductor 110 and to the DC link conductor 30b. The conductor 110 is coupled to the DC link conductor 30a through a diode D7 and is further coupled to an internal power supply 112 which provides power to the control unit 90.

As should be evident from the foregoing, the permanent magnet 102 and the armature windings 104a-104c together comprise a permanent magnet generator (PMG) which, in conjunction with the rectifier/filter 108 together form a DC power source.

The first power converter 26 includes a series of four power switching networks associated with four electrical windings W1-W4 of the motor/generator 22. One of the power switching networks includes a first or upper power switch Q7 coupled between the DC conductor 110 and a first end of an electrical winding W1 of the motor/generator 22, a second or lower power switch Q8 coupled between a second end of the electrical winding W1 and the DC conductor 30b, a first or lower diode D8 coupled between the DC conductor 30b and the first end of the electrical winding W1 and a second or upper diode D9 coupled between the second end of the electrical winding W1 and the DC link conductor 30a. In like fashion, additional power switching networks include power switches Q9-Q14 and diodes D10-D15 coupled to windings W2-W5 of the motor/generator 22. Further, flyback diodes D16-D23 are coupled across the switches Q7-Q14, respectively, and a filter capacitor C1 is coupled across the DC link conductors 30a and 30b.

Preferably, each of the power switches Q7-Q14 comprises an IGBT which, as seen in connection with the power switch Q7, includes gate, collector and main emitter electrodes as well as an auxiliary emitter electrode 120 which is coupled to the control unit 90. The unit 90 operates the switches Q7-Q16 to produce DC power on the DC link conductor 30a at a voltage between 600 to 700 volts DC. This voltage is provided to the subinverters 50-55 which in turn convert the DC power into 36-step AC power which is supplied to the filter 38 and to the AC/DC converter 40.

In the starting mode, AC power supplied to a set of lines 122 is provided via the summing transformer 66 to the subinverters 50-55. During this time, the control unit 90 turns off all of the switches in the subinverters 50-55. The flyback diodes of the subinverters, for example the diodes D1-D6 of the subinverter 50, rectify the AC power to produce DC power components which are combined by the interphase transformers 77-79 to produce combined DC power on the DC link conductors 30a, 30b. The control unit 90 operates the power switches Q7-Q16 as described in greater detail below to in turn develop voltages across the windings W1-W4 which cause the rotor structures of the motor/generator 22 to rotate and thereby develop the motive starting power.

As previously mentioned, operation in the starting mode may alternatively be accomplished by coupling a DC power source to the DC bus conductors 42a, 42b. This DC power may be supplied by a diode D24 to the DC link conductor 30a. Operation in the starting mode is otherwise identical to that described previously.

Figure 5:
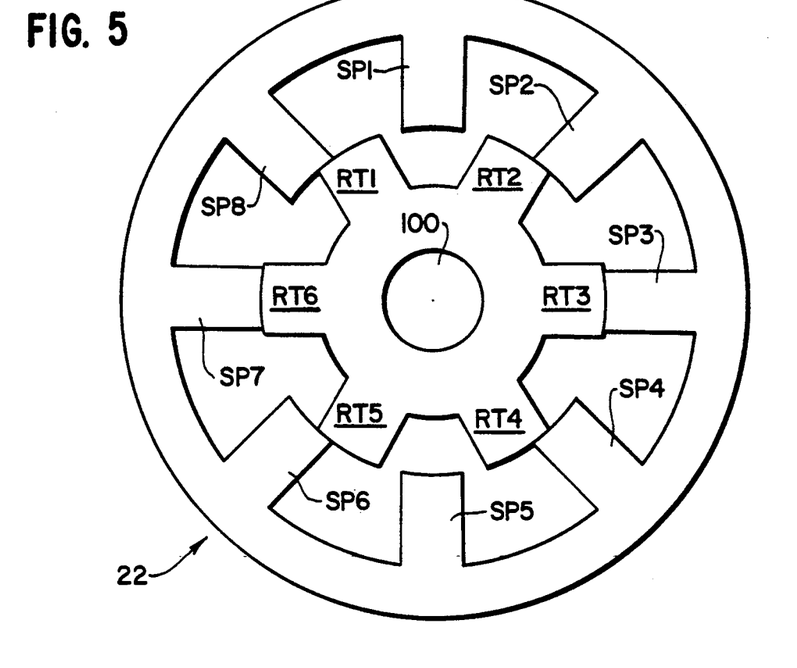
FIG. 5 is a diagrammatic illustration of the switched reluctance motor/generator of FIG. 2.
Figure 6:
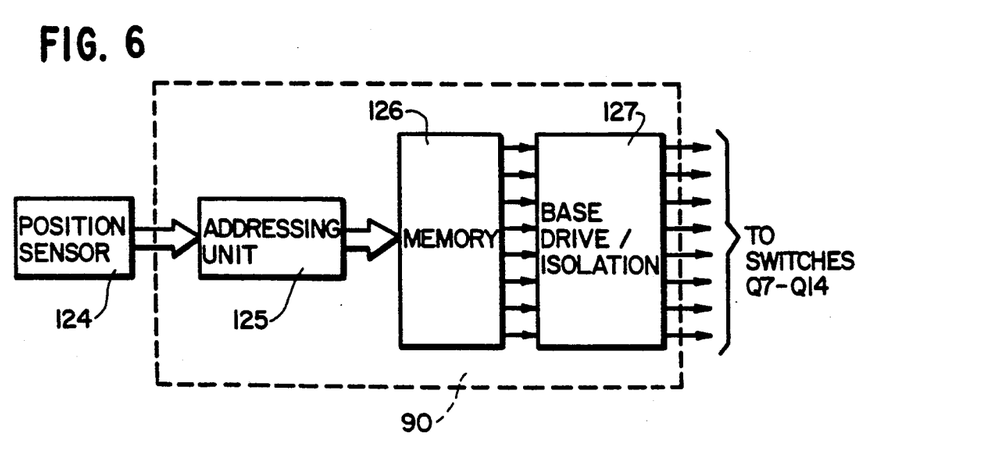
FIG. 6 is a block diagram of a portion of the control unit FIG. 4.

FIG. 5 illustrates the construction of the switched reluctance motor/generator 22 in greater detail. The motor/generator includes eight stator poles SP1-SP8 and six rotor teeth RT1-RT6. FIG. 5 illustrates the case where a rotor 123 of the motor/generator 22 is at zero degrees. The winding W1 includes winding portions wound on the stator poles SP1 and SP5 wherein the portions are connected together in series. In similar fashion, the winding W2 includes series connected winding portions wound on the stator poles SP2 and SP6, the winding W3 includes series-connected winding portions wound on the stator poles SP3 and SP7 and the winding W4 includes series connected winding portions wound on the stator poles SP4 and SP8.

Figure 7:
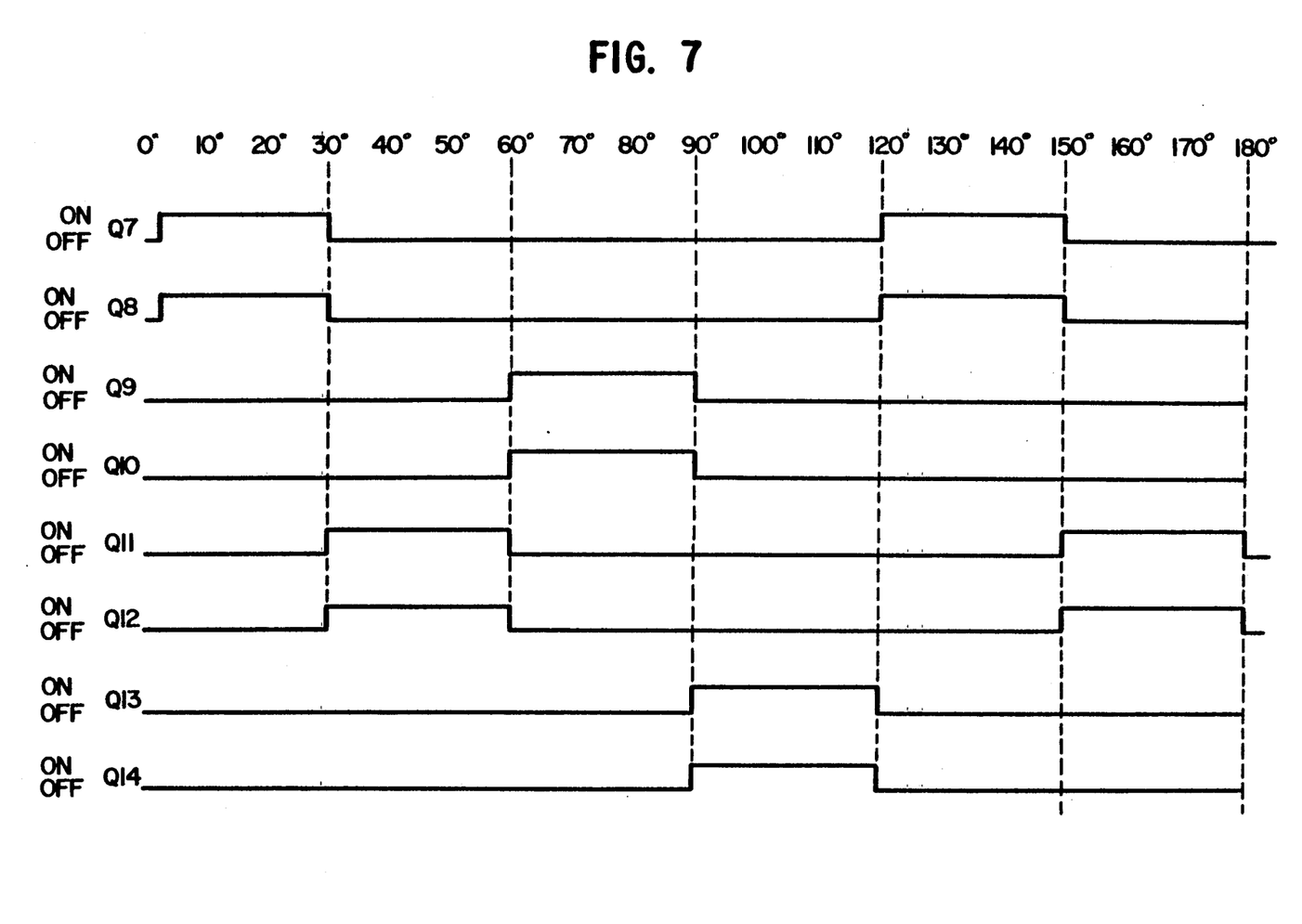
FIG. 7 is series of timing diagrams, illustrating the operation of the power converter of FIG. 4.
Figure 8:
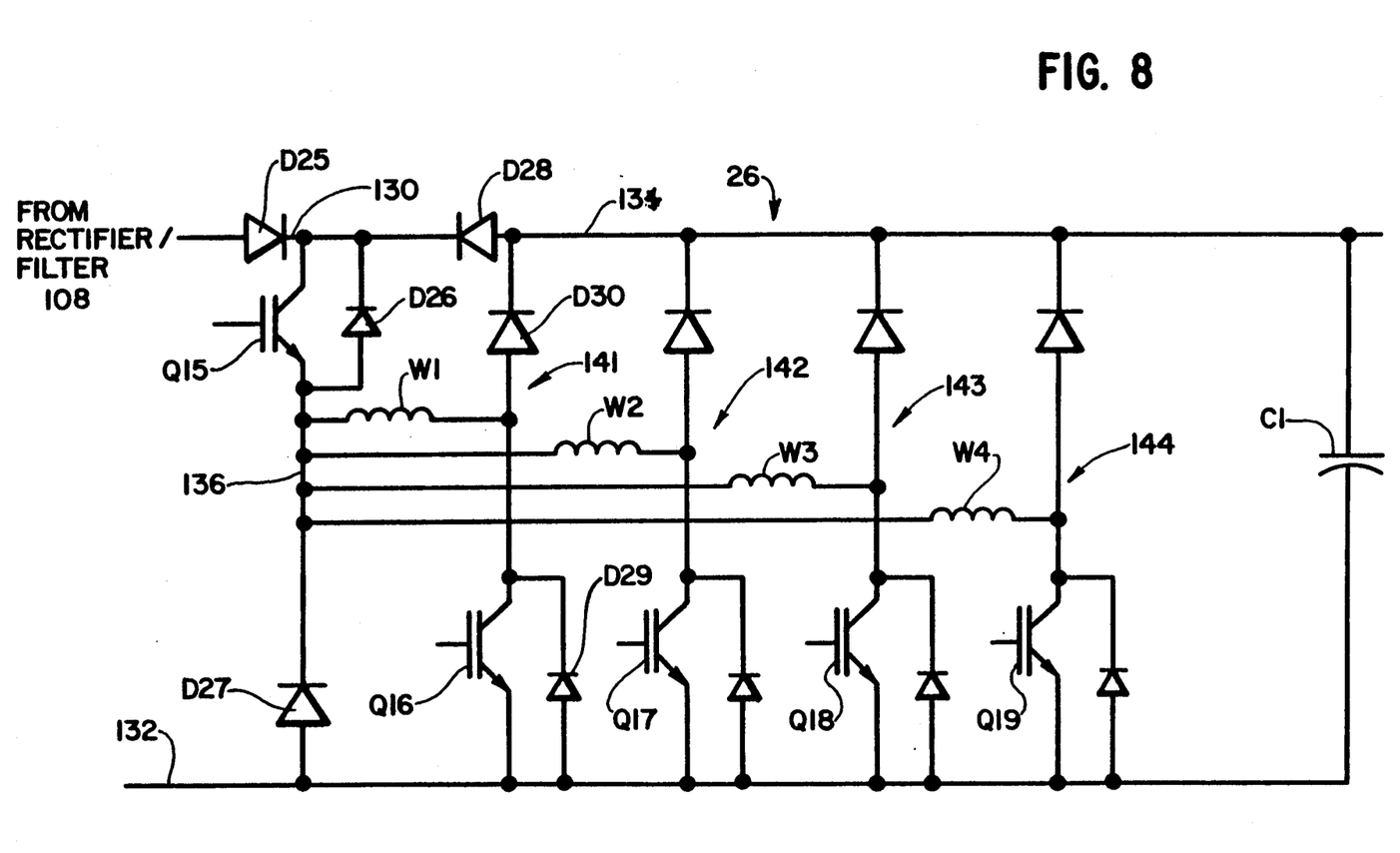
FIG. 8 is a schematic diagram illustrating an alternative embodiment of the power converter of FIG. 2.

The switches Q7-Q14 are operated during the generating and starting modes in the fashion illustrated in FIG. 7 by the portion of the control unit 90 illustrated in FIG. 8. The control unit 90 is responsive to the output of a position sensor 124 which detects the position of the rotor 123. The position sensor 124 is preferably of the optical type and develops digital words representing the angular position of the rotor 123. An addressing unit 125 is responsive to the output of the position sensor 124 and develops a series of addresses which are in turn provided to addressing inputs of a memory 126 which may comprise, for example, an EPROM. The memory 126 develops a series of eight-bit words at memory outputs which are in turn provided to a base drive/isolation circuit 127 that in turn develops base drive signals for the switches Q7-Q14.

As seen in FIG. 7, each power switch is turned for 30° of each 120° of rotation of the rotor 123. More particularly, the switches Q7 and Q8 and turned on in the interval between 0° and 30°, the switches Q11 and Q12 are turned on in the interval between 30° and 60°, the switches Q9 and Q10 are turned on the interval between 60° and 90° and the switches Q13 and Q14 are turned on the interval between 90° and 120°. The sequence described above thereafter repeats as the rotor 123 rotates beyond 120°.

As seen in FIG. 4, a total of 8 feeders are required to connect the windings W1-W4 to the power converter 26, one coupled to each end of each winding. FIG. 8 illustrates an alternative embodiment of the power converter 26 which requires only five feeders. The converter includes a diode D25 coupled between the rectifier/filter circuit 108 and a DC conductor 130. Coupled to the DC conductor 130 is an upper power switch Q15 together with an associated flyback diode D26 and a lower diode D27 coupled between the power switch Q15 and a second DC conductor 132. A diode D28 is coupled between the DC conductor 130 and a DC conductor 134. The DC conductors 134, 132 are coupled to the subinverters 50-55 and to the AC/DC converter 40 through the diode D24 described previously. First ends of the windings W1 through W4 are coupled to a common node or junction 136 between the power switch Q17 and the diode D27. Coupled to second ends of the windings W1-W4 are a series of four power switching networks 141-144, respectively. The power switching networks 141-144 are identical, and hence only the network 141 will be described in detail. The network 141 includes a lower power switch Q16 coupled to the DC conductor 132, an associated flyback diode D29 and an upper diode D30 which is coupled between the DC conductor 134 and the lower power switch. The switches Q15 and Q16, as well as power switches Q17-Q20, are operated by the control unit 90 to produce DC power on the conductors 134, 132 in the generating mode and to operate the motor/generator as a motor in the starting mode as described previously.

The power conversion system of the present invention utilizes a switched reluctance motor/generator which does not utilize rotating diodes or position sensors and which is highly reliable and inexpensive to manufacture. In addition, the motor/generator 22 can operate at a very high speed, thereby reducing the size of power handling components. The motor/generator can further operate at high temperatures and therefore is suited to harsh environments.

In addition to the foregoing, the power converters utilize high voltage components having reduced current rating and comprises a hybrid source of AC and DC power. In addition, the inverter provides output AC power which is easily filtered. Further, no contactors are required to configure the system in the starting and generating modes, and hence complexity is reduced.

We claim:

1. A power conversion system operable in a generating mode to convert motive power supplied by a prime mover into electrical power and in a starting mode to convert electrical power supplied by a power source into motive power, comprising:
   a switched reluctance motor/generator having a motive power shaft coupled to the prime mover during operation in the generating mode and an electrical winding;
   a first electrical power converter coupled to the electrical winding;
   a second electrical power converter coupled to the first electrical power converter by a DC link;
   means for coupling a load bus to the second power converter during operation in the generating mode, and for coupling the power source to either of the first and second power converters during operation in the starting mode; and
   means coupled to the power converters for operating same whereby the motor/generator develops electrical power in the generating mode which is rectified by the first power converter to produce DC power, the DC power being converted by the second power converter into output power and whereby DC power is provided on the DC link during operation in the starting mode which is in turn used by the first power converter to cause the motor/generator to develop motive power.

2. The power conversion system of claim 1, wherein the second power converter comprises a stepped-waveform inverter.

3. A power conversion system operable in a generating mode to convert motive power supplied by a prime mover into electrical power and in a starting mode to convert electrical power supplied by a power source into motive power, comprising:
   a switched reluctance motor/generator having a motive power shaft coupled to the prime mover during operation in the generating mode and an electrical winding;
   a first electrical power converter coupled to the electrical winding;
   a second electrical power converter coupled to the first electrical power converted by a DC link wherein the second power converter comprises a stepped-waveform inverter including six subinverters coupled to the first power converted by the DC link and a summing transformer coupled to the subinverters;
   means for coupling a load bus to the second power converter during operation in the generating mode, and for coupling the power source to either of the first and second power converters during operation in the starting mode; and
   means coupled to the power converters for operating same whereby the motor/generator develops electrical power in the generating mode which is rectified by the first power converter to produce DC power, the DC power being converted by the second power converter into output power and whereby DC power is provided on the DC link during operation of the starting mode which is in turn used by the first power converter to cause the motor/generator to develop motive power.

4. The power conversion system of claim 3, further including three interphase transformers each having a pair of end terminals coupled to a pair of subinverters and a mid-tap coupled to the DC link.

5. The power conversion system of claim 4, wherein the power source is coupled by the coupling means to the summing transformer during operation in the starting mode and develops AC power and wherein each subinverter includes a plurality of switches coupled together in a bridge configuration and a plurality of diodes coupled across each switch, the diodes of each subinverter rectifying the AC power from the power source to produce a DC power component during operation in the starting mode whereby the interphase transformers combine the DC power components to produce combined DC power on the DC link.

6. The power conversion system of claim 1, further including an AC/DC power converter coupled to the second power converter which develops DC power during operation in the generating mode.

7. A power conversion system, operable in a generating mode to convert motive power supplied by a prime mover into electrical power and in a starting mode to convert electrical power supplied by a power source into motive power, comprising:
- a switched reluctance motor/generator having a motive power shaft coupled to the prime mover during operation in the generating mode and an electrical winding;
- a first electrical power converter coupled to the electrical winding;
- a second electrical power converter coupled to the first electrical power converter by a DC link;
- means for coupling a load bus to the second power converter during operation in the generating mode, and for coupling the power source to either of the first and second power converters during operation in the starting mode;
- means coupled to the power converters for operating same whereby the motor/generator develops electrical power in the generating mode which is rectified by the first power converter to produce DC power, the DC power being converted by the second power converter into output power and whereby DC power is provided on the DC link during operation in the starting mode which is in turn used by the first power converter to cause the motor/generator to develop motive power; and
- an AC/DC power converter coupled to the second power converter which develops DC power during operation in the generating mode wherein the power source is coupled by the coupling means to the AC/DC power converter during operation in the starting mode and develops DC power which is supplied by the AC/DC power converter to the DC link.

8. A power converter system operable in a generating mode to convert motive power supplied by the prime mover into electrical power and in a starting mode to convert electrical power supplied by a power source into motive power, comprising:
- a switched reluctance motor/generator having a motive power shaft coupled to the prime mover during operation in the generating mode and an electrical winding;
- a first electrical power converter coupled to the electrical winding;
- a second electrical power converter coupled to the first electrical power converter by a DC link;
- means for coupling a load bus to the second power converter during operation in the generating mode, and for coupling the power source to either of the first and second power converters during operation in the starting mode;
- means coupled to the power converters for operating same whereby the motor/generator develops electrical power in the generating mode which is rectified by the first power converter to produce DC power, the DC power being converted by the second power converter into output power and whereby DC power is provided on the DC link during operation in the starting mode which is in turn used by the first power converter to cause the motor/generator to develop motive power; and
- a DC power source coupled to first and second DC conductors wherein the first power converter includes a first power switch coupled between the first DC conductor and a first end of the electrical winding, a second power switch coupled between a second end of the electrical winding and the second DC conductor, a first diode coupled between the second DC conductor and the first end of the electrical winding and a second diode coupled between the second end of the electrical winding and the DC link.

9. The power conversion system of claim 8, wherein the DC power source comprises a permanent magnet generator (PMG) driven by the prime mover during operation in the generating mode and having an output winding and a rectifier coupled between the output winding and the DC conductors.

10. The power conversion system of claim 8, wherein the motor/generator further includes additional electrical windings and wherein the first power converter further includes power switching networks each coupled to an associated one of the additional electrical windings and each comprising an upper power switch coupled between the first DC conductor and a first end of the associated electrical winding, a lower power switch coupled between a second end of the associated electrical winding and the second DC conductor, a lower diode coupled between the second DC conductor and the first end of the associated electrical winding and an upper diode coupled between the second end of the electrical winding and the DC link.

11. The power conversion system of claim 8, wherein the motor/generator further includes additional electrical windings each having first ends coupled to a junction between the first switch and the first diode and wherein the first power converter further includes power switching networks each coupled to a second end of an associated one of the additional electrical windings and each comprising a lower power switch coupled between the second end of the associated electrical winding and the second DC conductor and an upper diode coupled between the second end of the electrical winding and the DC link.

* * * * *